United States Patent

[11] 3,582,746

| [72] | Inventors | Dudley D. Nye, Jr.<br>Fort Lauderdale;<br>Thomas Pantelakis, Margate, both of, Fla. |
|---|---|---|
| [21] | Appl. No. | 837,458 |
| [22] | Filed | June 30, 1969 |
| [45] | Patented | June 1, 1971 |
| [73] | Assignee | Borg-Warner Corporation<br>Chicago, Ill. |

[54] MOTOR CONTROL SYSTEM WITH CURRENT LIMIT CIRCUIT
8 Claims, 3 Drawing Figs.

[52] U.S. Cl............................................. 318/331,
318/332, 318/434
[51] Int. Cl............................................. H02p 5/00
[50] Field of Search............................................. 318/331,
332, 434

[56] References Cited
UNITED STATES PATENTS

| 3,283,234 | 11/1966 | Dinger............... | 318/331 |
| 3,295,040 | 12/1966 | Schieman............... | 318/332 |
| 3,343,055 | 11/1967 | Havlicek et al............... | 318/332 |
| 3,286,151 | 11/1966 | Dinger............... | 318/331 |

*Primary Examiner*—Oris L. Rader
*Assistant Examiner*—K. L. Crosson
*Attorneys*—Donald W. Banner, William S. McCurry and John W. Butcher ABSTRACT: A DC motor control system is energized over semiconductor switches controlled by firing circuits coupled to a control amplifier stage. In turn, the control amplifier stage is regulated, in part, in accordance with a signal derived from a voltage divider circuit which provides a signal related to the motor terminal voltage. A current limit stage includes an operational amplifier circuit connected to receive an input signal related to the average motor armature current. The current limit stage also includes a constant current source circuit for providing a substantially constant output current through at least a portion of the voltage divider circuit, to modify the motor terminal voltage signal which regulates the control amplifier stage.

Inventors
Dudley D. Nye, Jr.
Thomas Pantelakis

By James J. Jennings, Jr.
Attorney 3,582,746

1

MOTOR CONTROL SYSTEM WITH CURRENT LIMIT CIRCUIT

BACKGROUND OF THE INVENTION

Various types of current limit circuits have been employed in DC motor control arrangements, but for many reasons such circuits have not been entirely satisfactory. One significant deficiency of many such circuits is that they operate very "stiffly" with an absolute current limitation after the predetermined current setting is reached. With such an absolute limitation after the preset current is obtained, any additional loading of the motor and the driven system will cause the motor and the driven system to slow down. However, it is desirable, under certain operating conditions, to allow the motor to run at slightly more than the preset current level, after the system goes into the current limit mode of operation, but this is not readily possible with many previous current limit arrangements.

Another shortcoming of many previous arrangements is the lack of uniformity of the "break point" at which the motor control system goes into the current limit mode at a given speed. That is, in plotting the motor speed as a function of motor current, as the current (or motor torque) gradually increases at a given speed, the point at which the curve breaks sharply and turns downwardly is not uniform in its occurrence.

Moreover, in many motor control systems it is desirable to regulate, preferably in a predetermined manner, the slope or rate at which the motor current or torque increases beyond a given current limit setting. This has not been attainable with many known current limit systems.

It is, therefore, a principal consideration of the present invention to provide a DC motor control system which has adjustable "stiffness" or rate at which the current limitation is imposed after the system goes into the current limiting mode.

It is a corrolary consideration of this invention to provide a DC motor control system with a uniform break point, or location at which the motor control system goes into the current limiting mode at a given speed.

Another significant consideration of the present invention is to provide such a system with means for predetermining the slope or the increase of torque after the system has entered the current-limiting mode of operation.

SUMMARY OF THE INVENTION

The present invention is useful in an energizing system for an electrical motor in which electrical energy is passed to the motor through a power circuit which includes at least one semiconductor switch. The system comprises a voltage divider circuit connected to provide a signal related to the motor terminal voltage. A control amplifier stage has an output connection for regulating the semiconductor switch and thus regulating motor energization. The control amplifier stage has an input connection coupled to the voltage divider circuit to receive the signal related to the motor terminal voltage.

Particularly in accordance with this invention, the motor-energizing system includes a current limit stage which has an input circuit connected to receive a control signal related to the level of current flow through the motor armature. An output circuit of this current limit stage is coupled to the voltage-divider circuit. An important component is a constant current circuit which is connected to pass a substantially constant current over the current limit stage output circuit and through at least a portion of the voltage-divider circuit, to modify the motor terminal voltage signal which is passed from the voltage-divider circuit to the control amplifier stage.

THE DRAWINGS

In the several figures of the drawings, like reference numerals identify like elements, and in the drawings.

DETAILED DESCRIPTION OF THE INVENTION

Figure 1:
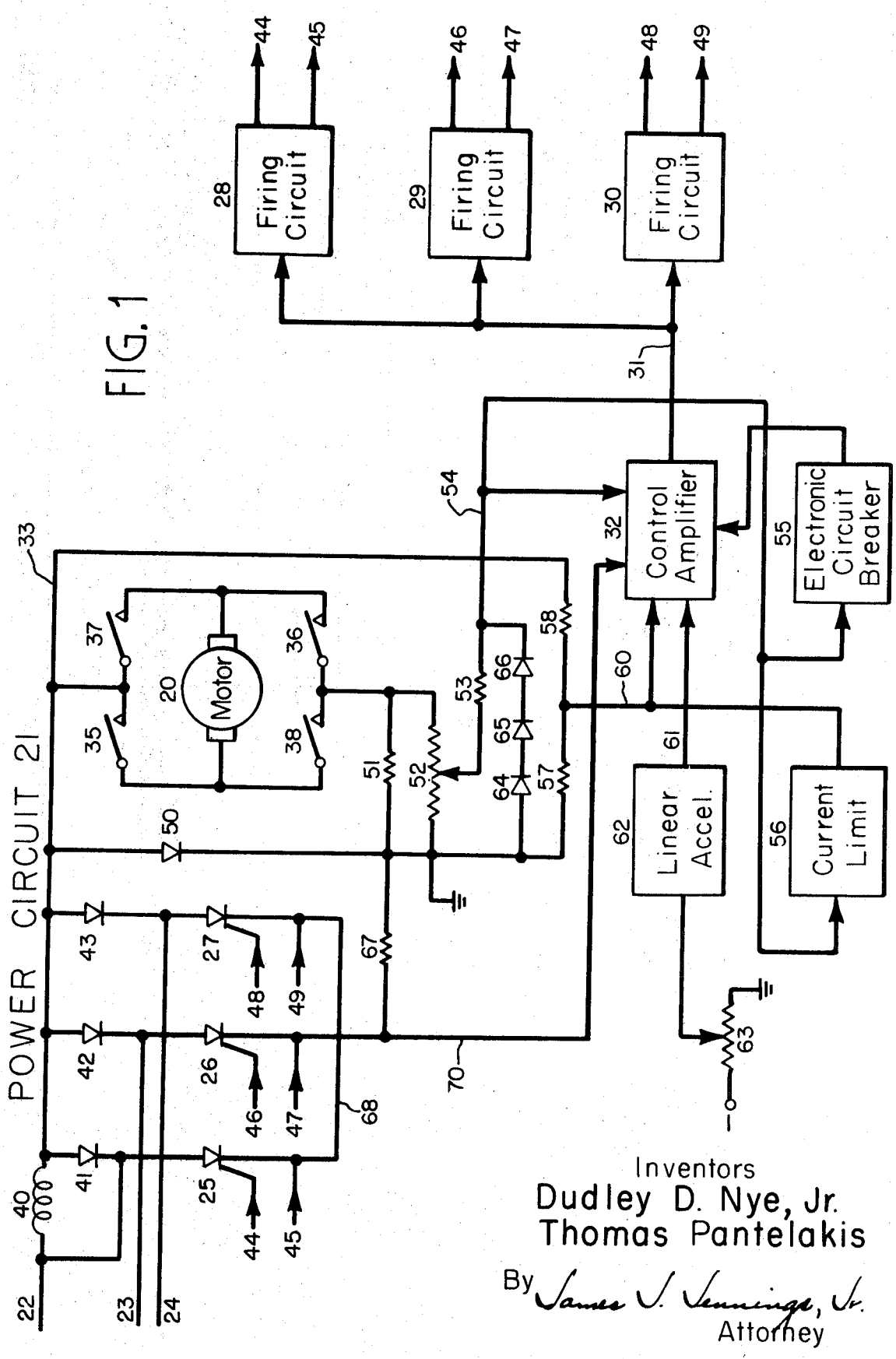
FIG. 1 is a block diagram, partly in schematic form, depicting this invention incorporated in a motor-energizing system.

FIG. 1 depicts a motor-energizing system in which the armature circuit of a motor 20 receives energy from a power circuit 21 which, in turn, is supplied with AC energy over three input conductors 22, 23 and 24. The level of energy passed to the motor is determined by the conduction times of semiconductor switches or silicon-controlled rectifiers (SCR'S) 25, 26 and 27 which, in turn, are regulated by gating signals provided by firing circuits 28, 29 and 30. The firing circuits are regulated by an output signal received over circuit 31 from a control amplifier 32, which operates in response to different input signals.

Motor 20 is energized as DC energy is passed through power circuit 21 and applied between conductors 33 and 34. When switches 35 and 36 are closed, current flows through motor 20 in a first direction and effects motor rotation in a given angular direction. When switches 35, 36 are opened and switches 37, 38 are closed (by control components which are not illustrated because they are well known), current flows through motor 20 in the opposite direction and effects motor rotation in the opposite angular direction.

Motor field winding 40 is coupled between conductors 22 and 33. Three diodes 41, 42 and 43 are respectively coupled in series with the semiconductor switches 25, 26 and 27. The input conductors 22—24 are respectively connected to the common connections between each diode-SCR pair. Although the semiconductor switches 25—27 are illustrated as silicon-controlled rectifiers, other components such as thyratrons, ignitrons, power transistors, transistors, electron-discharge devices and similar switching units can be used in their place. Only one semiconductor switch is required to regulate the level of motor energization. Such a switch can be coupled in a series circuit connection, in a "chopper" or DC-to-DC converter arrangement, in lieu of the illustrated rectifier arrangement. SCR 25 receives gating signals over conductors 44, 45 from firing circuit 28; SCR 26 receives gating signals over conductors 46 and 47 from firing circuit 29; and SCR 27 receives firing signals over conductors 48, 49 from firing circuit 30.

A "free-wheeling" diode 50 is coupled between conductor 33 and ground. Because of the inductive reactance of the motor, the turn-off of a given silicon-controlled rectifier may terminate current supply while the motor tends to keep current flowing; the freewheeling diode 50 maintains a path for the continuing current flow. A resistor 51 is coupled between conductor 34 and ground. A potentiometer 52 is coupled between conductor 34 and ground, and the movable arm is coupled over a resistor 53 to a common conductor 54 which, in turn, is coupled to control amplifier stage 32, an electronic circuit breaker stage 55, and a current limit stage 56. The stages 32 and 55 are illustrated to give an overall perspective of the motor-energizing system, but are not necessary to an understanding of the present invention. For purposes of this explanation, conductor 54, together with resistor 53, a portion of potentiometer 52, and resistor 51, can be considered as means for providing a control signal, related to the level of current flow through the motor armature, for application to the current limit stage 32.

A pair of resistors 57, 58 are coupled in series between conductor 33 and ground to function as a voltage-divider circuit which provides a voltage related to the terminal voltage of motor 20. Conductor 60 is coupled to the common connection between resistors 57, 58 and to a first input connection of control amplifier 32. Conductor 60 is also coupled to the output connection of current limit stage 56. From the illustrated circuit arrangement, it is evident that conductor 60, with voltage-divider resistors 57 and 58, represents means for applying a signal related to the terminal voltage of motor 20 to an input connection of control-amplifier stage 32. The control amplifier also receives a speed reference signal over line 61 from a linear acceleration stage 62 shown receiving an input signal from the movable arm of a potentiometer 63. Linear acceleration stage 62 is utilized to translate a step function change of the setting of potentiometer 63 into a gradual, smooth transition of a speed control signal applied over line 61 to control amplifier stage 32.

Three diodes 64, 65 and 66 are coupled in series between conductor 54 and ground to protect against an unduly large signal being passed over conductor 54 to the stages 56, 55 and 32 if resistor 51 were to open, or if for some other reason an excess of current were to be suddenly supplied over resistor 53. A resistor 67 is coupled between ground and a common conductor 68 coupled to the cathodes of all the semiconductor switches 25, 26 and 27. Conductor 70 is coupled to the common connection of resistor 67 and common conductor 68, and is also coupled to control stage 32.

Figure 2:
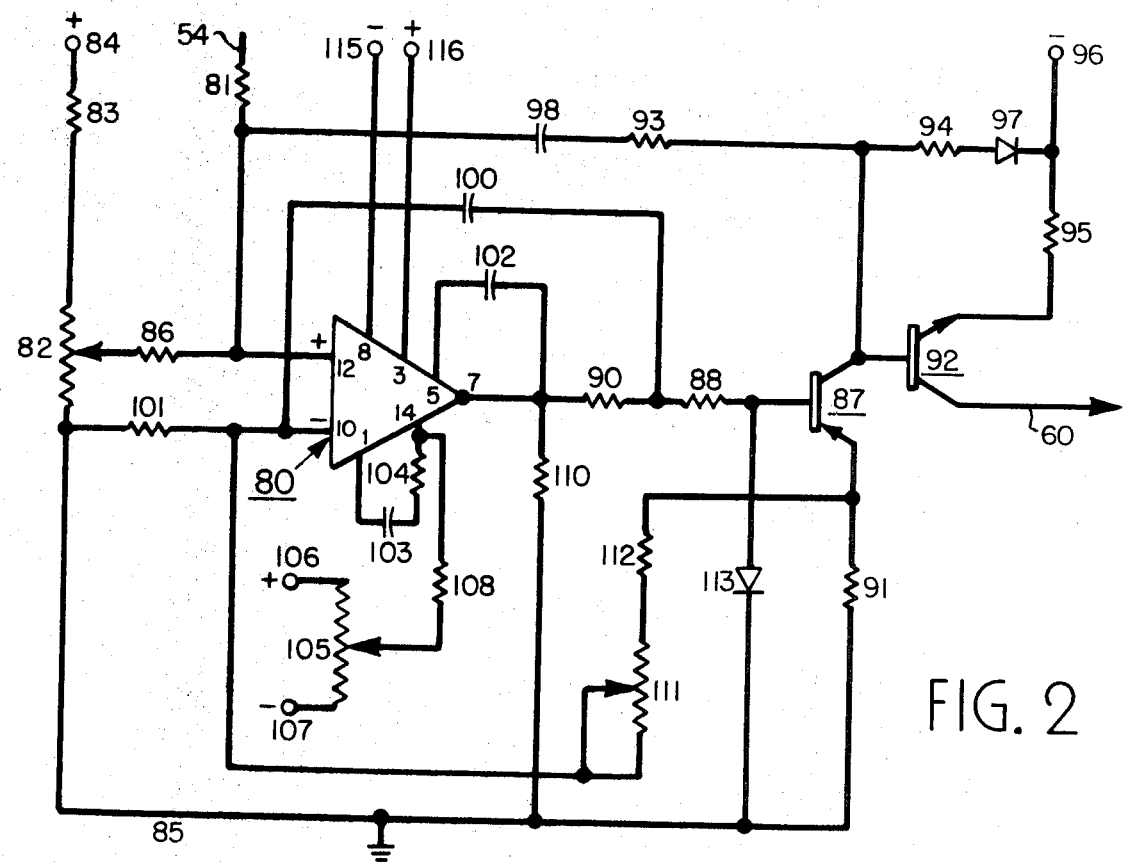
FIG. 2 is a schematic diagram illustrating the circuit details of the current limit stage shown more generally in FIG. 1

Considering now the schematic details of current limit stage 56 depicted in FIG. 2, an important component of the current limit stage is an operational amplifier (op amp) 80. For purposes of general explanation, the first input terminal 12 of this op amp will be considered as an input circuit connected to receive a control signal, over conductor 54 and a resistor 81, which is related to the level of current flow through the motor armature circuit. A potentiometer 82 is connected as the means for setting the current level at which the system goes into the current limit mode of operation. The upper end of this potentiometer is coupled through a resistor 83 to a terminal 84, to which a unidirectional positive energizing potential (relative to ground conductor 85) is applied. A resistor 86 is coupled in series between the movable arm of potentiometer 82 and first input terminal 12 of op amp 80. Thus, resistors 81 and 86 can be considered as means for summing the control signal related to the armature current with a current limit reference signal, to provide a resultant sum signal for application to the input circuit of op amp 80. The terminals of the op amp are referenced internally, except for terminal 7, which is shown outside the triangular op amp. This is done to assist those skilled in the art to practice the invention with a minimum of experimentation. Other switching units may also be utilized, but the operational amplifier has proved most effective in this arrangement.

A PNP type transistor 87 is depicted with its base coupled through a series circuit including resistors 88 and 90 to the output connection 7 of the op amp. The emitter of transistor 87 is coupled through a resistor 91 to ground, and its collector is coupled both to the base of an NPN type transistor 92 and to a common connection between the pair of resistors 93 and 94. The emitter of transistor 92 is coupled through another resistor 95 to a terminal 96 for receiving a negative unidirectional energizing potential. A diode 97 is coupled between resistors 94 and 95.

It is important to note that NPN type transistor 92 is connected to function as a constant current source, for providing a substantially constant output current over conductor 60 to flow through at least a portion (57) of the voltage divider arrangement, when transistor 92 is switched on by the conduction of transistor 87 in response to a negative-going signal from op amp 80. Thus, the main signal and control path is from input conductor 54 and current limit set potentiometer 82, through op amp 80, transistor 87 and constant current source 92 through a portion of the voltage divider circuit 57, 58.

Considering now the other components of the current limit stage, a capacitor 98 is coupled in series with resistor 93 to complete a feedback network between first input terminal 12 of op amp 80 and the connection between the collector transistor 87 and the base of transistor 92. This negative feedback network determines the frequency response of the entire current limit loop, and is also utilized to prevent self-oscillation. Capacitor 100 completes a negative feedback path between the second input terminal 10 of the op amp and the common connection between resistors 88, 90 at the output side of the op amp. This feedback path reduces the response of op amp 80 to the ripple frequency of the power supply.

A resistor 101 is coupled between input terminal 10 of the op amp and ground. Another capacitor 102 is connected between terminal 5 of the op amp and output terminal 7. This capacitor, together with a series circuit including capacitor 103 and resistor 104 coupled between terminals 1 and 14 of the op amp, prevents high frequency oscillation due to the internal delays of the op amp 80. A bias adjust potentiometer 105 is coupled between terminals 106 and 107, and the movable arm of potentiometer 105 is coupled through a resistor 108 to terminal 14 of the op amp. A resistor 110 is coupled between ground and output terminal 7 of the op amp. Important to the adjustment of the system is a torque control potentiometer 111, shown coupled in series with a resistor 112 between second input terminal 10 of the op amp and the emitter of transistor 87. A diode 113 is coupled between ground and the base of transistor 87.

Figure 3:
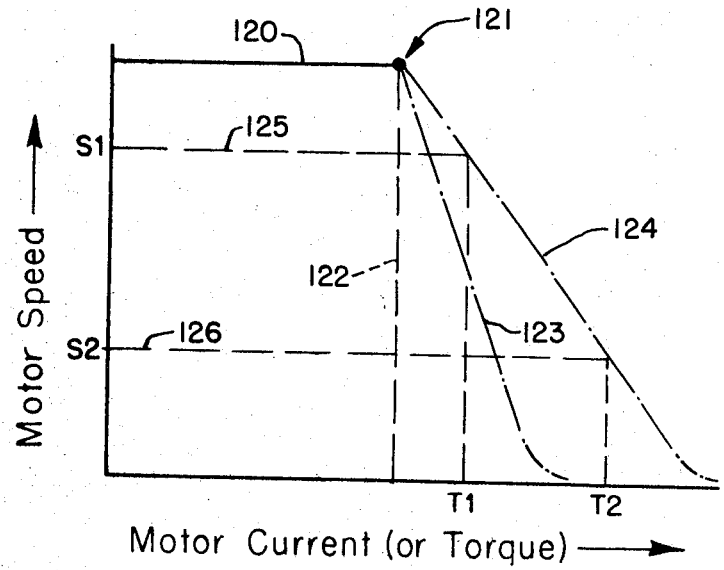
FIG. 3 is a graphical illustration useful in understanding operation of this invention.

The adjustable "stiffness" or response of the system after it is switched into the current limiting mode can better be understood with reference to FIG. 3. As there shown, a plot of motor speed on the ordinate axis is given as a function of motor current or torque. At a given speed, such as that represented by the solid line 120, the motor current gradually increases until the break point 121 is reached, at which point the increasing IR signal on conductor 54, which signal is negative-going relative to the positive polarity signal derived over potentiometer 82, causes a switch in polarity of the op amp 80 which gates on transistor 87 and rapidly drives on transistor 92, providing the constant current signal on conductor 60. If the control system were very stiff, the dropoff in speed would be virtually that depicted by broken line 122; the system just would not allow the armature current to go above that value at the break point. This condition occurs with maximum resistance in potentiometer 111, the torque control adjustment of the current limit stage. As the amount of resistance in the feedback path with resistor 112 is gradually decreased, there is more negative feed back from the emitter of transistor 87 to second input terminal 10 of op amp 80, and the motor is allowed to increase its torque or current gradually after the break point, for example, along the slope represented by the dash-dot line 123. With additional feedback, by further decreasing the effective resistance value of potentiometer 111, the motor torque is allowed to decrease along the slope of dash-dot line 124.

This adjustment is of significant utility for many applications where a roll of material is wound up and, if a constant angular velocity of the windup roll were maintained, the tension developed in the web would damage or break the material. Suppose, for example, that the drum on which the material is wound is initially energized at speed S1 represented by broken line 125. At this speed, torque T1 is developed. As the effective diameter of the drum increases with the take up of material, the speed is gradually reduced toward S2, or line 126, and if the setting of potentiometer 111 is such as to cause the torque to change along the line 124, the torque value would be T2 at speed S2. With this gradual increase in the torque as the angular velocity of the windup drum is decreased, an approximately even tension can be maintained in the traveling web of material. For mathematical precision, the curve representing speed/torque (such as 123 or 124) should be other than a straight line, but in practice it has been shown that the straight-line approximation is sufficiently close so as to maintain effective motor control and avoid any damage to the material being treated and wound up.

Important to the uniformity of the break point 121, or the point at which the entire system goes into the current limit mode, is the utilization of the transistor 92 and its associated circuit components as a constant current source. The term "constant current source" has an accepted meaning in this art, and those skilled in this technology appreciate that "source" does not refer to a battery or energizing means, but to an arrangement which when appropriately energized delivers current at substantially a constant level. It is noted that the motor control systems can go into the current limit mode at different speeds. However, for any given speed, the motor terminal voltage is different than for another speed, and thus the voltage appearing across resistors 57, 58 in the voltage divider circuit will likewise vary. If only a voltage control arrangement were utilized to provide a voltage output signal for compensation, the amount of voltage compensation would be a different percentage of the speed at different settings. In accordance with this invention, the conduction of transistor 92 always provides substantially the same current flow over conductor 60 to cause the same voltage drop across resistor 57 and compensate the system whenever the current limit stage 56 goes into the current limit mode.

The placement and sense of connection of diode 97 in the circuit with transistor 92 is also significant. A voltage drop of approximately 6/10 volt between the base and emitter of transistor 92 is required to forward bias and gate on this transistor. As the gain of the circuit including op amp 80 is lowered, it takes a greater current signal to provide the requisite voltage drop across resistor 94 to gate on transistor 92. However, with diode 97 provided and connected as shown, the drop across this component approximates the base-emitter voltage drop of transistor 92. Thus, transistor 92 is always just at the point of conduction, so the slightest output from transistor 87 will cause transistor 92 to increase its conduction. It is noted that the gain of the op amp circuit is not lowered until transistor 87 conducts, and, therefore, no similar component is required in the circuit with transistor 87 to offset the base-emitter drop and insure rapid and positive conduction. That is, the negative feedback comes after, or in the collector circuit, of transistor 87, which is part of the negative feedback arrangement.

Further to assist those skilled in the art to make and use the invention, a tabulation of circuit components and values is set out below. It is understood that this is in no sense by way of limitation but only to minimize the experimentation requisite to put the invention into practice. In the circuit, op amp 80 was a GE type PA-238. With the circuit of FIG. 2, a negative 16 volt potential relative to ground was applied to terminal 96. A minus 6 volts DC was applied to terminals 107 and 115. A positive 6 volts DC potential relative to ground was applied to terminals 84, 106, 116. The other components in the circuit of FIG. 2 were:

87—2N3638
    92—2N2714
    97, 113—1N5059
    98—4.7 mfd., ±20%, 50 v. DC
    100—0.01 mfd., ±10%, 250 v. DC
    102—47 pfd., ±10%, 500 v. DC
    103—0.033 mfd., ±10%, 250 v. DC
    81, 86—15 kohms, ±5%
    82—500 ohms, ±10%
    83—6.65 kohms, ±1%
    88, 101—3.9 kohms, ±5%
    90, 112—1 kohms, ±10%
    91, 94—2.4 kohms, ±5%
    93—4.7 kohms, ±5%
    95—2.0 kohms, ±5%
    104—390 ohms, ±10%
    105—10 kohms, ±20%
    108—22 kohms, ±10%
    110—10 kohms, ±10%
    111—8 mohms, ±40%

While only a particular embodiment of the invention has been described and illustrated, it is apparent that various modifications and alterations may be made therein. It is, therefore, the intention in the appended claims to cover all such modifications and alterations as may fall within the true spirit and scope of the invention.

What we claim is:

1. An energizing system for an electrical motor in which electrical energy is passed to the motor through a power circuit including at least one semiconductor switch, comprising: a voltage-divider circuit connected to provide a signal related to the motor terminal voltage, a control-amplifier stage, having an output connection connected to regulate operation of the semiconductor switch and thus regulate energization of the motor, and having an input connection coupled to the voltage divider circuit to receive the signal related to the motor terminal voltage, and a current limit stage, including an input circuit connected to receive a control signal related to the level of current flow through the motor armature, an output circuit coupled to said voltage-divider circuit, and a constant current circuit connected to pass a substantially constant current over said output circuit through a portion of the voltage-divider circuit to modify the motor terminal voltage signal passed from the voltage-divider circuit to said control-amplifier stage.

2. A motor-energizing system as claimed in claim 1 in which said current limit stage further comprises an operation amplifier having first and second input terminals and an output terminal, means for coupling the output terminal of said operational amplifier to regulate conduction of the constant current circuit, means including said input circuit for applying said control signal to the first input terminal of the operational amplifier, which control signal is of a given polarity, and means for supplying a reference signal, of a polarity opposite of said given polarity, which is summed with said control signal to provide a resultant sum signal which is applied to said first input terminal, such that the resultant sum signal changes polarity when the control signal indicates the motor current has exceeded the level indicated by the reference signal.

3. A motor-energizing system as claimed in claim 2, in which said constant current circuit includes a first transistor connected to operate as a constant current source.

4. A motor-energizing system as claimed in claim 3 and further comprising a second transistor, coupled between the output terminal of the operational amplifier and the constant current source, for increasing the conduction of said constant current source as the output signal of the operational amplifier indicates the motor armature current exceeds the level required to enter the current limit mode of operation.

5. A motor-energizing system as claimed in claim 3 and further comprising circuit means coupled in the emitter-collector circuit of the first transistor to complete a path for current flow through at least said portion of the voltage-divider circuit, the emitter-collector path of the first transistor and the circuit means, and a diode, coupled between the base and the emitter of said first transistor, to insure that the constant current source transistor is just at the point of conduction to provide rapid system operation.

6. A motor-energizing system as claimed in claim 4 and further comprising a feedback potentiometer, coupled between the emitter of said second transistor and the second input connection of the operational amplifier, to adjust the amount of feedback in the current limit stage and correspondingly regulate the slope of the motor current-speed characteristic beyond the point at which the system enters the current limit mode.

7. A motor-energizing system as claimed in claim 3 and further comprising a feedback circuit, including a resistor and a capacitor, coupled between the first input connection of the operational amplifier and a common connection between the first and second transistors.

8. An energizing system for a DC electrical motor in which electrical energy is passed to the motor through a power circuit which includes a plurality of SCR's regulated by at least one firing circuit, comprising: a voltage divider circuit connected to provide a signal related to the motor terminal voltage, a control-amplifier stage, having an output circuit connected to regulate operation of the firing circuit and thus regulate energization of the motor, and having an input circuit coupled to the voltage-divider circuit to receive the motor terminal voltage signal, and a current limit stage, including an operational amplifier having first and second input connections and an output connection, a transistor connected as a constant current source for increasing its conduction in response to a signal provided by said operational amplifier to provide a substantially constant current flow over an output conductor and through at least a portion of said voltage divider circuit to modify the motor terminal voltage signal passed to the control-amplifier stage, means coupled to said first input connection of the operational amplifier for providing a control signal of given polarity and related to the level of motor armature current flow, and means including a potentiometer for providing an adjustable reference signal of a polarity opposite said given polarity to said first input connection of the operational amplifier, such that an increase of the motor armature current above a level represented by the setting of said potentiometer effects a transition of the operational amplifier output signal and places the system in the current limit mode of operation.